(12) United States Patent
Nishikawa

(10) Patent No.: US 6,421,141 B2
(45) Date of Patent: *Jul. 16, 2002

(54) IMAGE PROCESS APPARATUS AND METHOD

(75) Inventor: Naoyuki Nishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,348

(22) Filed: Mar. 28, 1997

(30) Foreign Application Priority Data

Apr. 2, 1996 (JP) ............................................. 8-080010

(51) Int. Cl.$^7$ .............................................. G06F 15/00
(52) U.S. Cl. .......................... 358/1.9; 358/504; 358/518
(58) Field of Search ................................. 395/109, 112; 382/163, 167, 162, 274; 358/518, 520, 504, 525, 1.9, 1.13; 345/431

(56) References Cited

U.S. PATENT DOCUMENTS

| 4,270,141 A | * | 5/1981 | Sakamoto .................... 358/525 |
| 5,218,671 A | | 6/1993 | Liao et al. |
| 5,254,978 A | | 10/1993 | Beretta |
| 5,307,182 A | * | 4/1994 | Maltz .......................... 358/518 |
| 5,416,890 A | * | 5/1995 | Beretta ........................ 345/431 |

OTHER PUBLICATIONS

"Overcoming Color Deficiencies In OS/2 Controls When Using The Color Palette", Anonymous, IBM Technical Disclosure Bulletin, vol. 37, No. 3, Mar. 1994, pp. 585–586, XP000441593, New York, US.

* cited by examiner

*Primary Examiner*—Joseph Mancuso
*Assistant Examiner*—Vikkram Bali
(74) *Attorney, Agent, or Firm*—Fitzpatrick, Cella, Harper & Scinto

(57) ABSTRACT

An image processing method of generating a color image by using a color palette table. The method includes a restriction step of restricting colors registerable in the palette table, on the basis of gamut data on an image output device which outputs the color image, a formation step of forming the color palette table on the basis of the color restriction obtained in the restriction step, and a generation step of generating the color image by using the colors registered in the color palette table.

7 Claims, 14 Drawing Sheets

| PALETTE NO. | R | G | B |
|---|---|---|---|
| 1 | 0 | 0 | 0 |
| 2 | 10 | 10 | 10 |
| 3 | 20 | 30 | 40 |
| ⋮ | ⋮ | ⋮ | ⋮ |
| N | 255 | 250 | 200 |

FIG. 12

IMAGE PROCESS APPARATUS AND METHOD

BACKGROUND OF THE INVENTION

1. Field of the Invention

The present invention relates to a system for printing color data displayed on a color monitor of a computer, by using a color printer.

2. Related Background Art

It will be explained hereinafter a conventional technique concerning a system for printing color data on a color monitor of a computer by using a color printer.

Initially, the entire system will be briefly explained. The color data which has been edited on a host computer is stored in a memory, a filing system or the like in the host computer. In a case where the stored color data is printed by the color printer, after the color data is appropriately subjected to color correction in a gamma correction process and a matrix conversion process, obtained color information is transferred to the color printer. In the conventional technique, a color development characteristic of the monitor, a color reproduction characteristic of the color printer, and the like can be predicted or foreseen within a range of restricted accuracy or precision. For example, measurement of a sample which is performed by measurement equipment or the like and a model which is obtained by using interpolation calculation are defined to be applied to such prediction.

In such system, for example, color matching between a color on the color monitor and a color on the color printer can be realized by appropriately adjusting parameters applied to the above-described gamma correction process and the matrix conversion process. In many cases, such parameter is determined by a simulation calculation such as a least square or the like. At that time, there is a merit function (or performance function) or the sample as a factor which significantly affects a result of such determination. Ordinarily, a color space which is perceptibly uniform is defined, and a distance (i.e., color difference or chrominance) in such color space is used as the performance function. Further, as the sample, samples are ordinarily used which are appropriately diffusive.

However, even in a color matching system which has been theoretically designed, there is a remarkable difference between the color on the color monitor and the color on the color printer. That is, the color difference itself in the above-described uniform color space has been applied on the premise of the color matching between the same media (e.g., printed matter versus printed matter). Therefore, if the color difference is used, the color matching between different-kinds of media (e.g., monitor versus printed matter) does not always succeed.

In such case, the most serious problem occurs when a displacement or an aberration occurs in hue.

In order to clarify such problem as to the displacement in hue, the perceptible same hue (i.e., same hue in sight) should be strictly separated from the same hue consisting of each primary color in a device in a monitoring system (e.g., EBU (European Broadcasting Union) system, NTSC (National Television System Committee) system or the like).

In the perceptible same hue, the same hue is defined by human sight or view as being representative of the Munsell color system. Generally, the so-called uniform color space is correctly named as a perceptible uniform color space. Ideally, such perceptible uniform color gamut is designed such that the perceptible same hue is linearly mapped from an origin. On the other hand, the same hue in an RGB (red, green and blue) device is defined as the same hue for a color group in which a ratio of each input value is constant. For example, in a case where each of R, G and B is represented as (R, G, B) with values 0 to 255, it is assumed that blue groups (0, 0, 0)→(0, 0, 64)→(0, 0, 128)→(0, 0, 192)→(0, 0, 225) on the monitor have the same hue.

In a case where each color on the monitor is mapped to the perceptible uniform color space, each color is linearly mapped. Therefore, the same-hue color in the monitor system tends to be considered as having the same hue in the uniform color space. However, when the color on such a line is actually reproduced by the color printer, blue (0, 0, 255) in a primary color is printed as purple, whereby the printed blue is viewed as a color remarkably different from the blue on the monitor.

In a case where the uniform color space is a coordinate space in which the same hue defined in sight is linearly mapped, and in a case where the same-hue color on the monitor is plotted in the uniform color space, although such same hue is linearly represented, the color on a monitor is viewed as the different-hue color on the printer. It is supposed that this is complicatedly affected by a difference between a color area of the Munsell color system and a color area of the monitor, a relation between hue and saturation and the like. Therefore, even if some correction is not performed, such problem can not be solved.

SUMMARY OF THE INVENTION

An object of the present invention is to provide an image processing apparatus and method which can faithfully reproduce a color in a displayed image.

In order to achieve the above object, there is provided in the present invention an image processing method of generating a color image by using a color palette table, comprising the steps of:

restricting colors which can be registered in the palette table, on the basis of gamut data of an image output means outputting the color image;

forming the color palette table on the basis of the color restriction obtained in the restriction step; and generating the color image by using the colors which have been registered in the color palette table.

Another object of the present invention is to provide an image processing apparatus and method which absorb a system difference between color development and light generation, a difference in media or the like, and performs matching in color appearance between a color in a generated image and color in the displayed image.

In order to achieve the above object, there is provided in the present invention an image processing method comprising:

an input step of causing an image formation means to form a target image on the basis of target data, and inputting image data obtained by reading the target image with an image read means;

correction step of correcting the target data belonging to a range neighboring a predetermined hue such that its saturation is raised and its hue is rotated, so as to generate the corrected target data; and a color process parameter generation step of generating a color process parameter on the basis of the image data and the corrected target data.

The above and other objects of the present invention will become apparent from the following detailed description when read in conjunction with the accompanying drawings.

BRIEF DESCRIPTION OF THE DRAWINGS

FIG. 12 is a view showing an example of a color palette table;

DETAILED DESCRIPTION OF PREFERRED EMBODIMENTS (First Embodiment)

Initially, an example of a printer according to the first embodiment will be explained hereinafter.

Figure 14:
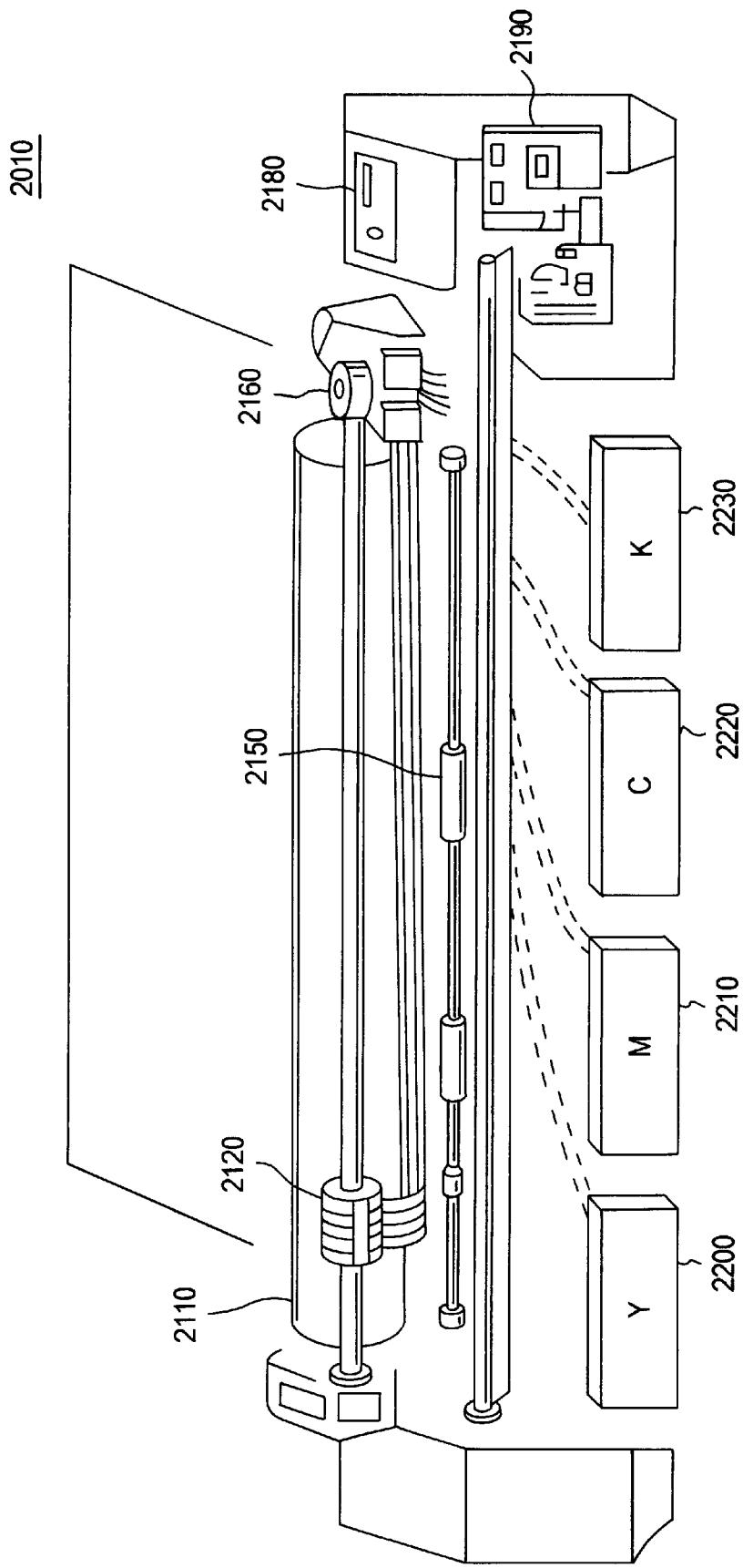
FIG. 14 is a block diagram showing an example of a structure of a color printer.

FIG. 14 is a schematic view showing the structure of a color printer 2010 in the first embodiment. In the drawing, reference numerals 2200 to 2230 denote color ink cartridges, respectively. That is, yellow (Y), magenta (M), cyan (C) and black (K) color inks are filled in the cartridges 2200, 2210, 2220 and 2230, respectively. An independent pipe extends from each ink cartridge and is connected to a pressure pump 2160. Each color ink is supplied with a predetermined pressure, from the pressure pump 2160 to a print head 2120. A printing paper is supplied from a rear side of the color printer 2010, and then the supplied paper is fixed by a platen roller 2110 and a front guide roller 2150. The printer 2010 is operated by depressing key buttons on a control panel 2180, and a control board 2190 controls the entire color printer 2010. In order to cause the color printer 2010 to perform printing, print control instructions and print data are sent to the printer 2010 via an interface (not shown). For example, in a case where RGB (red, green and blue) colors are designated based on a color designation instruction, the control board 2190 converts RGB data into CMYK data by using an internal color process unit and then drives the print head 2120 to perform the printing.

Figure 1:
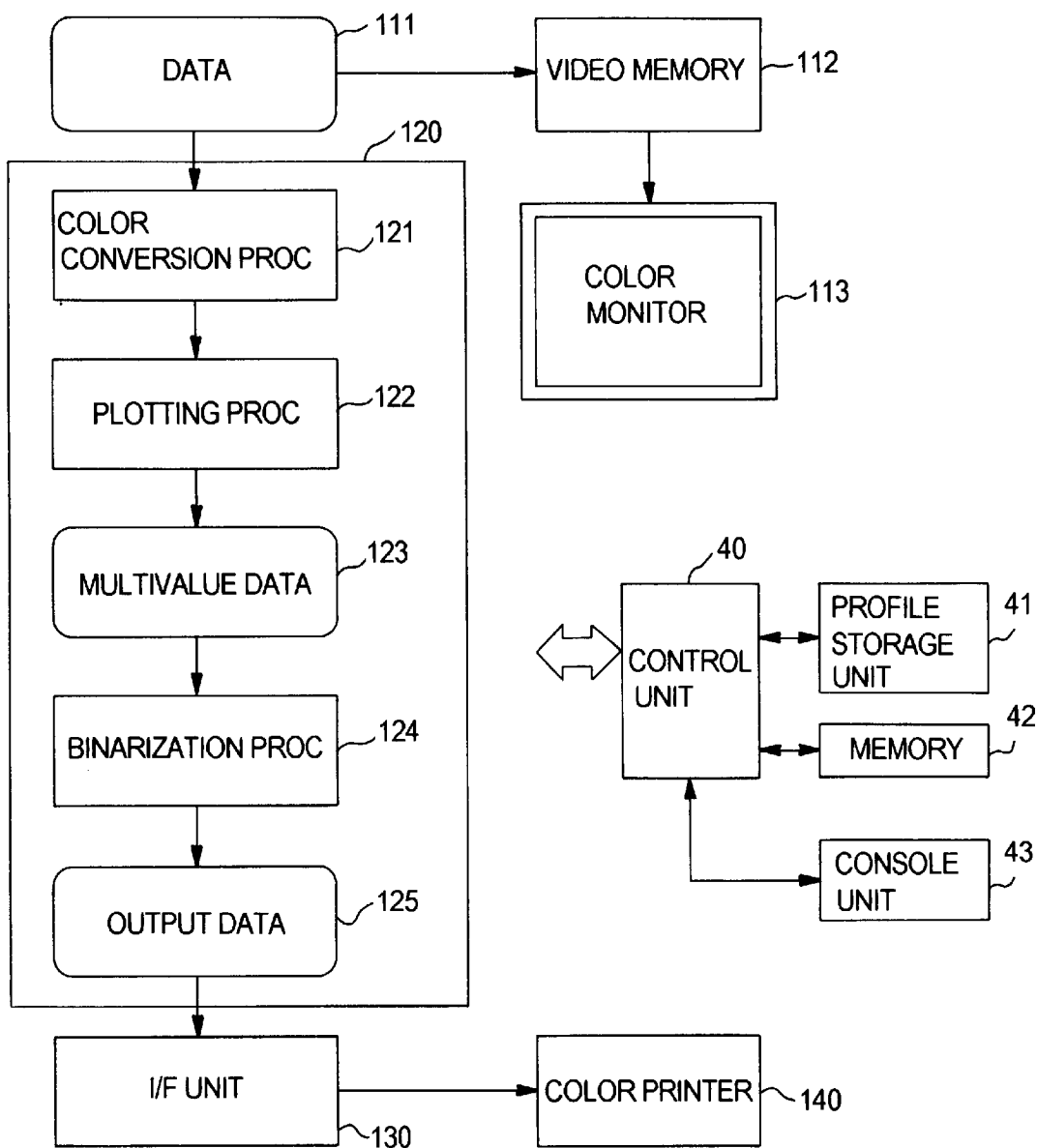
FIG. 1 is a block diagram showing an example of a color printing system according to a first embodiment of the present invention.

FIG. 1 is a schematic block diagram showing a process in a color image system according to the first embodiment. In the drawing, print data 111 is processed in a series of module groups 120 to generate output data 125 in a host computer. Then, after, the output data 125 is transferred to a color printer 140 via an interface unit 130 such that the color printer 140 performs printing and outputting. The print data 111 is composed of various objects (i.e., figure, image and character), and each object includes color information which is defined in an RGB system. On the basis of such color information, a print image is developed into a video memory 112, and then the entirety or the part of the print data can always be recognized or confirmed on a color monitor 113. The module groups 120 are composed of a color conversion process 121, a plotting process 122 and a binarization process 124. In the color conversion process 121, the color information in the RGB system, which information is included in each object, is converted into the image information in a CMYK system which is suitable for the printing. In the plotting (or drawing) process 122, each object is developed into a printing coordinate system. Further, in the binarization process 124, multivalue data 123 obtained in the plotting process 122 is binarized. As a result of such series of processes, the output data 125 is generated.

Each of the above-described modules is controlled by a control unit 40. That is, the control unit 40 sets a source profile and a printer profile both stored in a profile storage unit 41 and a parameter stored in a memory 42, to each module on the basis of a mode which has been set by a user with a console unit 43.

Figure 2:
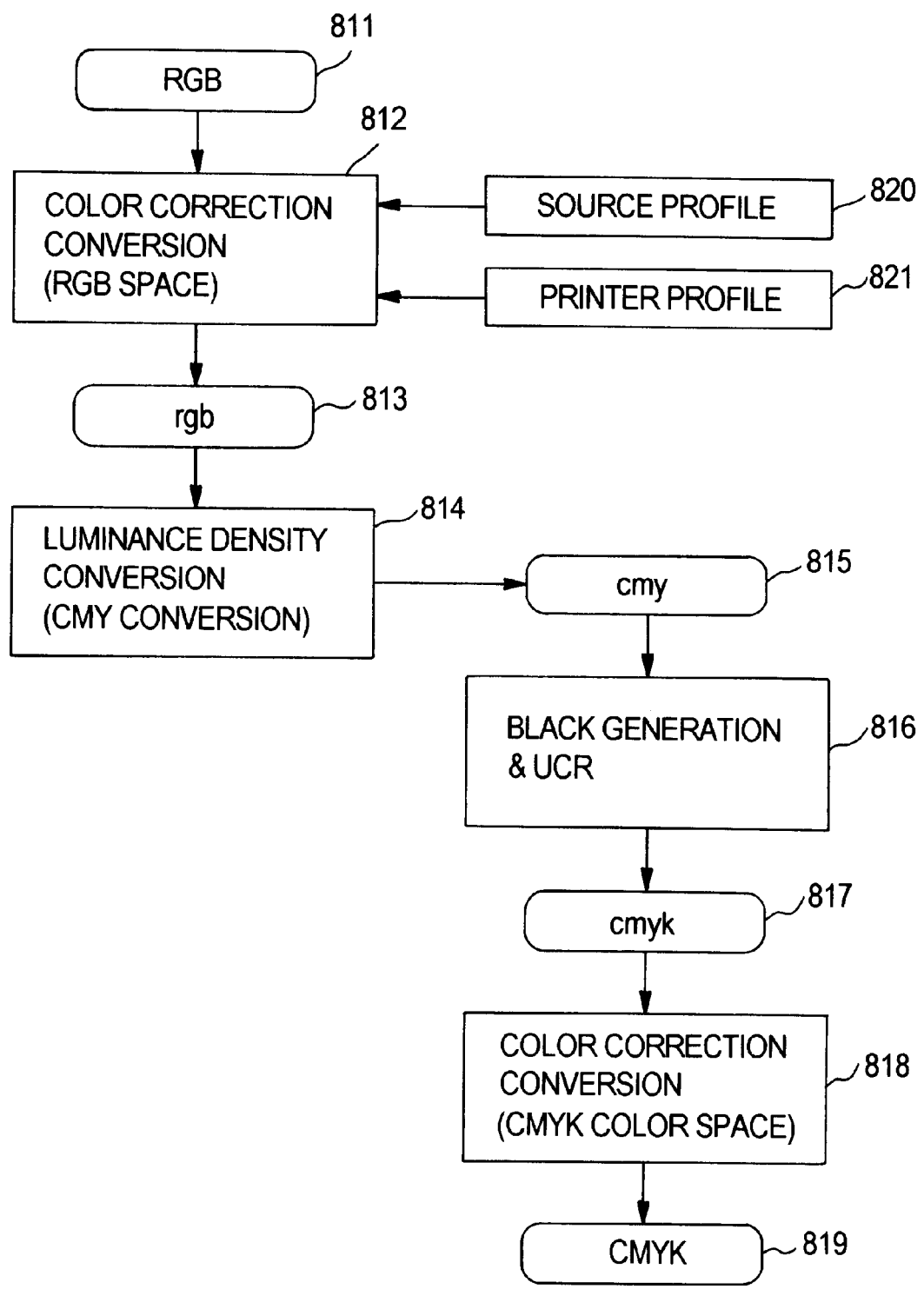
FIG. 2 is a block diagram showing an example of a color conversion process.

FIG. 2 is a block diagram for explaining in detail actual processes in the color conversion process 121.

In a color correction conversion process 812, input data 811 corresponding to the print data 111 in FIG. 1 is subjected to a color correction process in an RGB color space, to obtain rgb data 813. In the printer, definition of "rgb" is designed with the intention of having a characteristic represented by the RGB color space independent of a device, e.g., NTSC-RGB color space. On the other hand, definition of "RGB" is designed in consideration of a color space (monitor or the like) dependent on a device. Therefore, while the parameter to be used for correcting CMYK data in the subsequent process is characterized to be uniformly determined, the color correction in this process is performed in consideration of color matching with the device.

That is, a matching process is performed to match the color formed by the color printer 140 on a recording medium with the color of the image displayed on the color monitor 113.

In the matching process performed in the color correction conversion process 812, gamma correction on the RGB data 811 dependent on the monitor 113 is performed on the basis of a gamma parameter described in a source profile 820 corresponding to the monitor 113. Further, a LUT (look-up table) corresponding to a matching method which has been set from the console unit 43 is selected from among LUTs described in a printer profile 821 corresponding to the printer 140, and then color conversion is performed on the basis of the selected LUT. In the printer profile 821, the LUT has been stored or described in correspondence with the matching method.

In the first embodiment, the various matching methods are provided, i.e., the matching method which gives priority to vividness (or brightness), the matching method which gives priority to color tint, and the matching method in which colorimetrically obtains the color matching.

In the matching method giving the priority to vividness, the image data belonging to a predetermined color space is not subjected to the mapping, but the image data belonging to outside of the predetermined color space is subjected to the mapping within a color reproduction gamut (or range) of the color printer such that a saturation component thereof is maintained. In the matching method giving the priority to color tint, the mapping is performed such that gradation of the entire image is maintained, i.e., such that the gradation of the input image can be reproduced in the output image. In other words, the image data which is included in the image and belongs to the outside of the color reproduction gamut of the printer is subjected to the mapping within the color reproduction gamut. Further, in the matching method for colorimetrically obtaining the color matching, the image data is subjected to the mapping within the color reproduction gamut of the printer such that the color difference between the input and output image data is minimized.

The printer profile 821 includes the parameter corresponding to each matching method.

In a luminance density conversion process 814, the rgb data 813 is subjected to mapping in the CMY color space. Then, cmyk data 817 is obtained in a black generation and UCR (under color removal) process 816. In a color correction conversion process 818, the cmyk data 817 is corrected in the CMYK color space, and finally CMYK color data 819 is obtained. The parameter to be used in the process can be obtained in a later-described simulation process (FIG. 3), and has been stored in the memory 42. (Color conversion process parameter (CMYK) used in color correction conversion 818)

Figure 3:
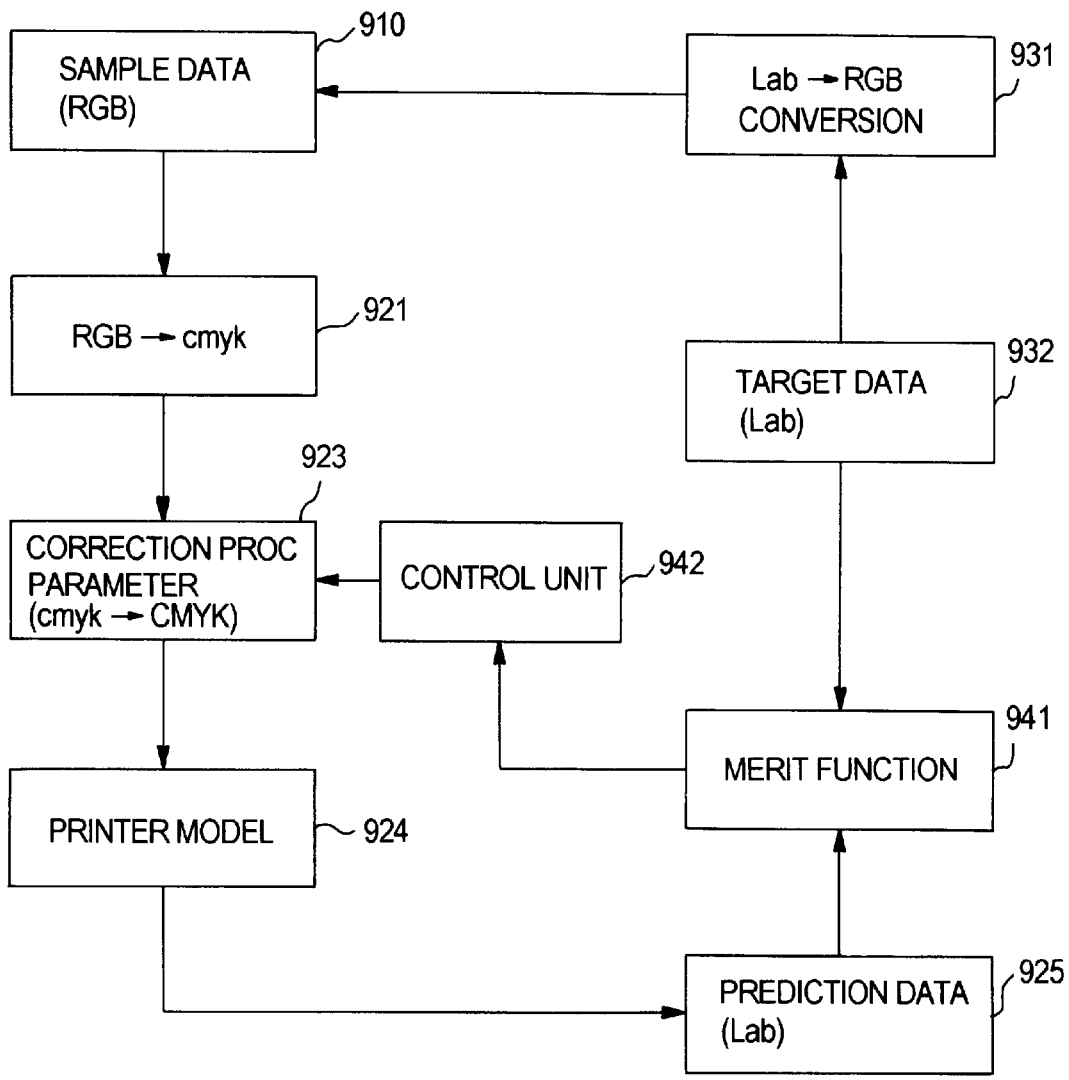
FIG. 3 is a block diagram showing an example of a simulation calculation for obtaining CMYK (cyan, magenta, yellow and black) color correction parameters.

In case of structuring the color process system according to the first embodiment, a parameter is obtained from a subsequent stage. Therefore, in the process, the parameter to be used for correcting the CMYK data is first determined or obtained and then the parameter to be used for correcting the RGB data is obtained. FIG. 3 is a block diagram showing the simulation process for obtaining the parameter to be used in the color correction of the CMYK data.

Figure 5:
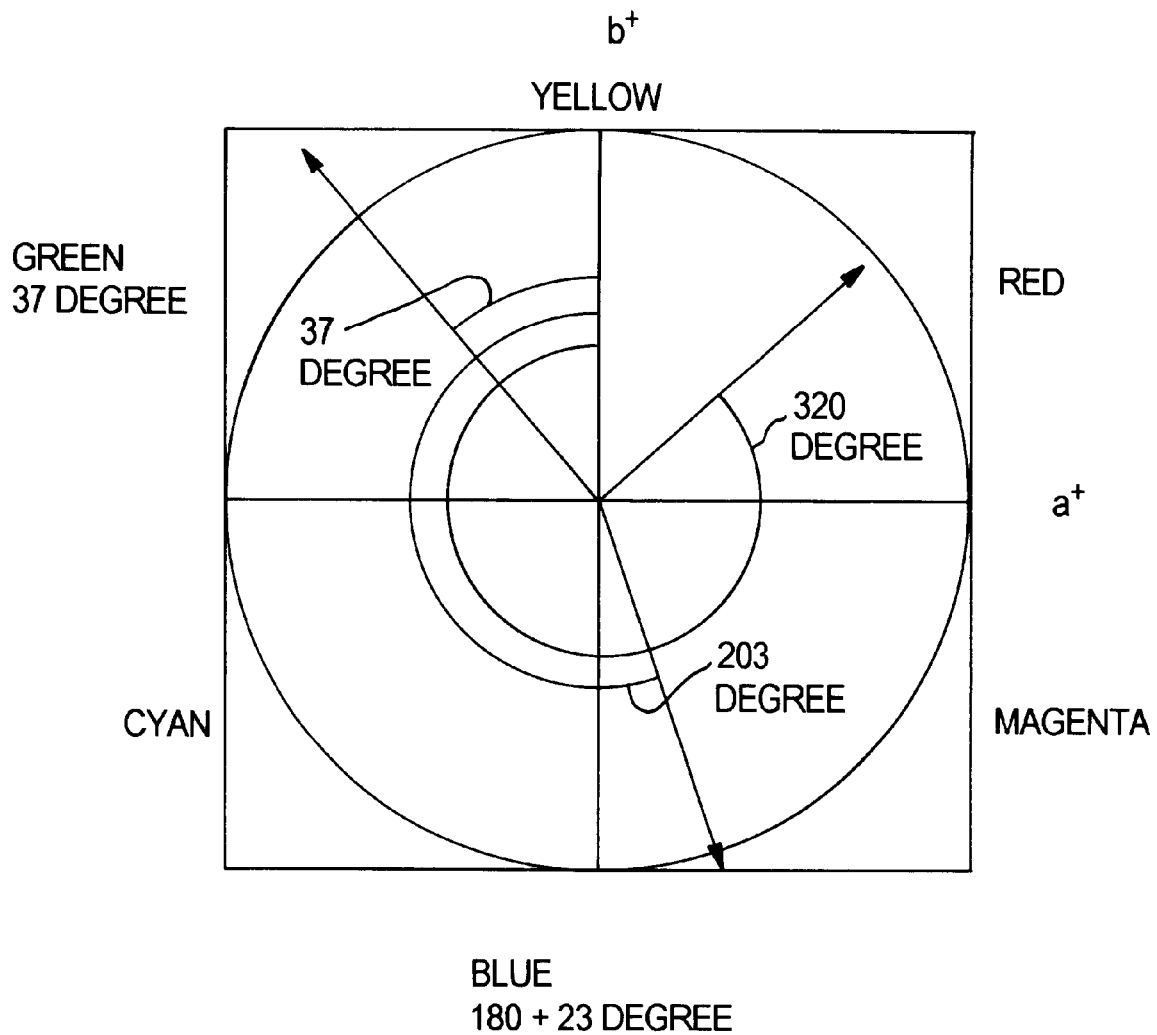
FIG. 5 is a view showing changes in hue and saturation in a case where colors reproduced when outputting primary colors (R, G, B) in a conventional color printing system are plotted in a uniform color space.
Figure 6:
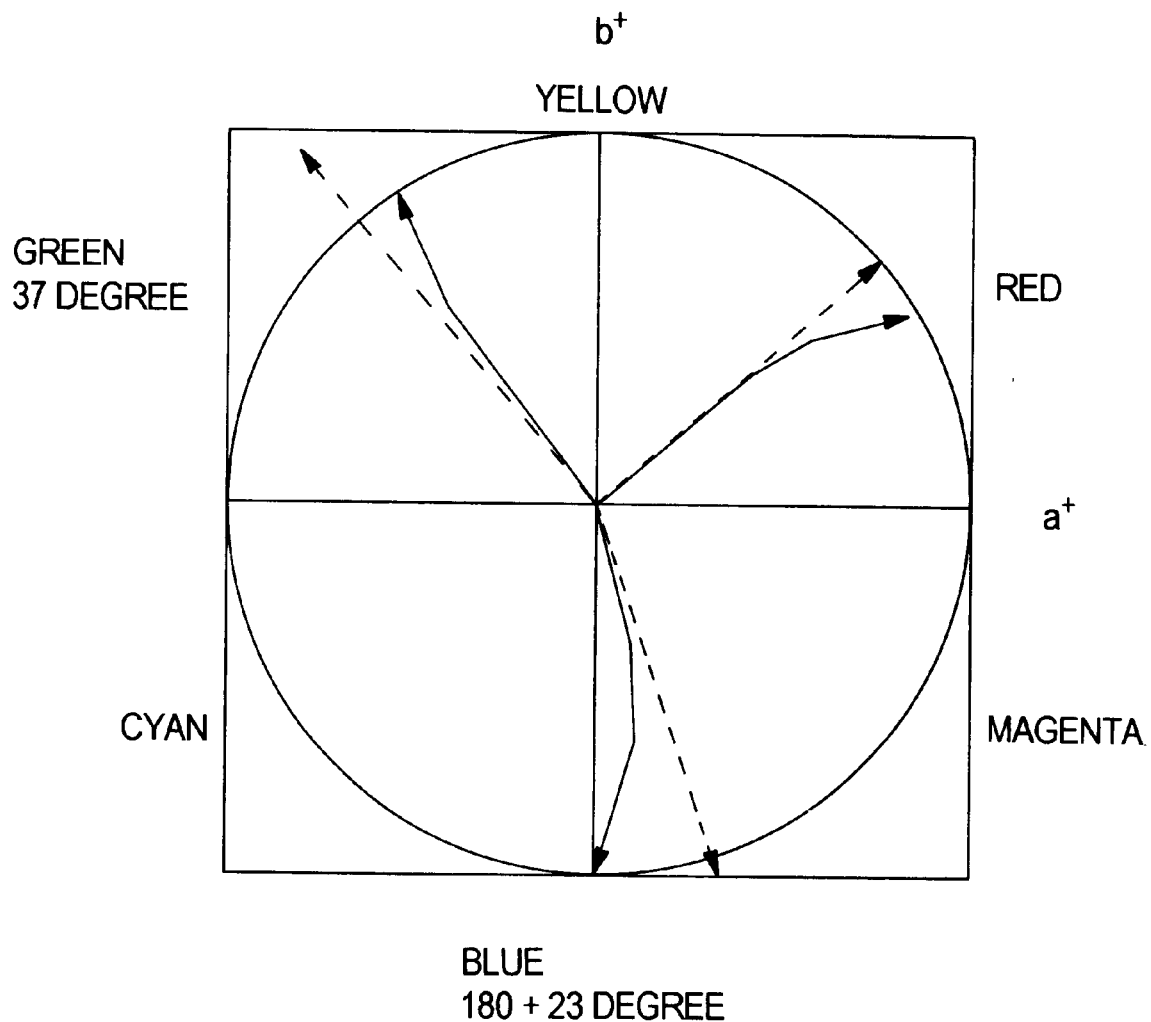
FIG. 6 is a view in which a result of the fine controlling process for the primary colors (R, G, B) is represented in the uniform color space.

Initially, a printer model 924 is formed in the color printer to which the CMYK data is input. In the printer model 924, the data obtained by uniformly dividing the CMYK colors is input, the sampling output of the data is performed, and then the sampling output is measured by a calorimeter, whereby a characteristic of the color printer is simulated. In the simulation process, an interpolation calculation is applied based on the data at sampling points, and values corresponding to values of the input CMYK data are calculated and predicted. At that time, the color reproduction gamut of the printer is simultaneously checked, and a color sample for uniformly dividing the color reproduction gamut as much as possible is appropriately picked up. Then, target data 932 is generated on the basis of the color sample. In this case, the target data 932 is represented by using CIE 1976 Lab value (to be referred simply as Lab value hereinafter). In the simulation process, the target data 932 having the Lab value is converted into an RGB signal by using a conversion equation defined in NTSC (process 931), to generate sample data 910. In a process 921, the input RGB signal is converted into the cmyk data by using predetermined calculation equations (i.e., luminance density conversion, black generation, UCR). In a correction process 923 which is the same process as the color correction conversion process 818 in FIG. 2, the color correction is performed in the CMYK color space on the basis of the correction parameter. In such color correction, a parameter obtained by mapping as an initial value the cmyk data as is (in unit of column) is used as the correction parameter. Further, it is structured in the simulation calculation that a correction term is immediately increased or decreased in response to an instruction from a control unit 942. In the correction process, the value which has been mapped from the cmyk data into the CMYK data is input to the printer model 924, and the Lab value when outputting is obtained as prediction data 925 (Lab value). The obtained prediction Lab data 925 is simultaneously entered into a merit function (or performance function) 941 with the target data 932, and an entire error amount evaluated in the merit function 941 is then input to the control unit 942. The control unit 942 refers to a result of a partial differential calculation or the like and observes the entire error amount. Simultaneously, the control unit 942 increases or decreases each correction term such that the entire error amount is converged. In this case, the process to be used is a well-known attenuation least square or the like, therefore the detailed explanation thereof is omitted. When the color signal is input into the color printer on the basis of the parameter determined in the manner as described above, e.g., as shown in FIG. 5, red scale data is output along a hue line of 320°, green scale data is output along the hue line of 37°, and blue scale data is output along the hue line of 203°. In FIG. 5 and FIG. 6 (described later), a b value is plotted along an axis of the ordinate and an a value is plotted along an axis of the abscissa, and further a rotational angle is defined such that a counterclockwise rotation is a positive rotation. (LUT used in color correction conversion 812)

The color printer which has been designed in consideration of the above-described procedure can perform the color reproduction which is preferable colorimetrically. However, in a case where the color on the monitor is actually printed, the printed color is reproduced as a color which is remarkably different from the color on the color monitor because of the essential difference in the color matching between different kinds of devices. As the essential difference, there is the difference in the color reproduction gamut inherent in each device, the difference in mechanism of color development and light emission, the difference in media, or the like.

Therefore, in the first embodiment, the mapping corresponding to the matching method is performed to absorb the difference in the color reproduction gamut inherent in each device. Further, in order to absorb the difference in the mechanism of color development and light generation, the difference in the media or the like, and thus to obtain the matching in color appearance in correspondence with each of the matching method for giving the priority to vividness and the matching method for giving the priority to color tint, a linear conversion (or transformation) using a linear matrix is performed for fine control of the results of the above-described mapping.

The matching method for giving the priority to vividness and the matching method for giving the priority to color tint are performed in case of attaching importance to an atmosphere of the entire image. Therefore, in order to obtain the matching of the color appearance, the fine control corresponding to each matching method is performed irrespective of a fact that such fine control makes the color colorimetrically different from others.

On the other hand, the matching method for obtaining the colorimetrical matching minimizes the color difference in the input and output images. Therefore, in such matching method, any fine control is not performed because the fine control undesirably increases the color difference colorimetrically.

The LUT which is stored or described in the printer profile 821 and corresponds to each matching method is formed by synthesizing the mapping corresponding to the above-described matching method and the LUT for performing the fine control for each other.

Figure 4:
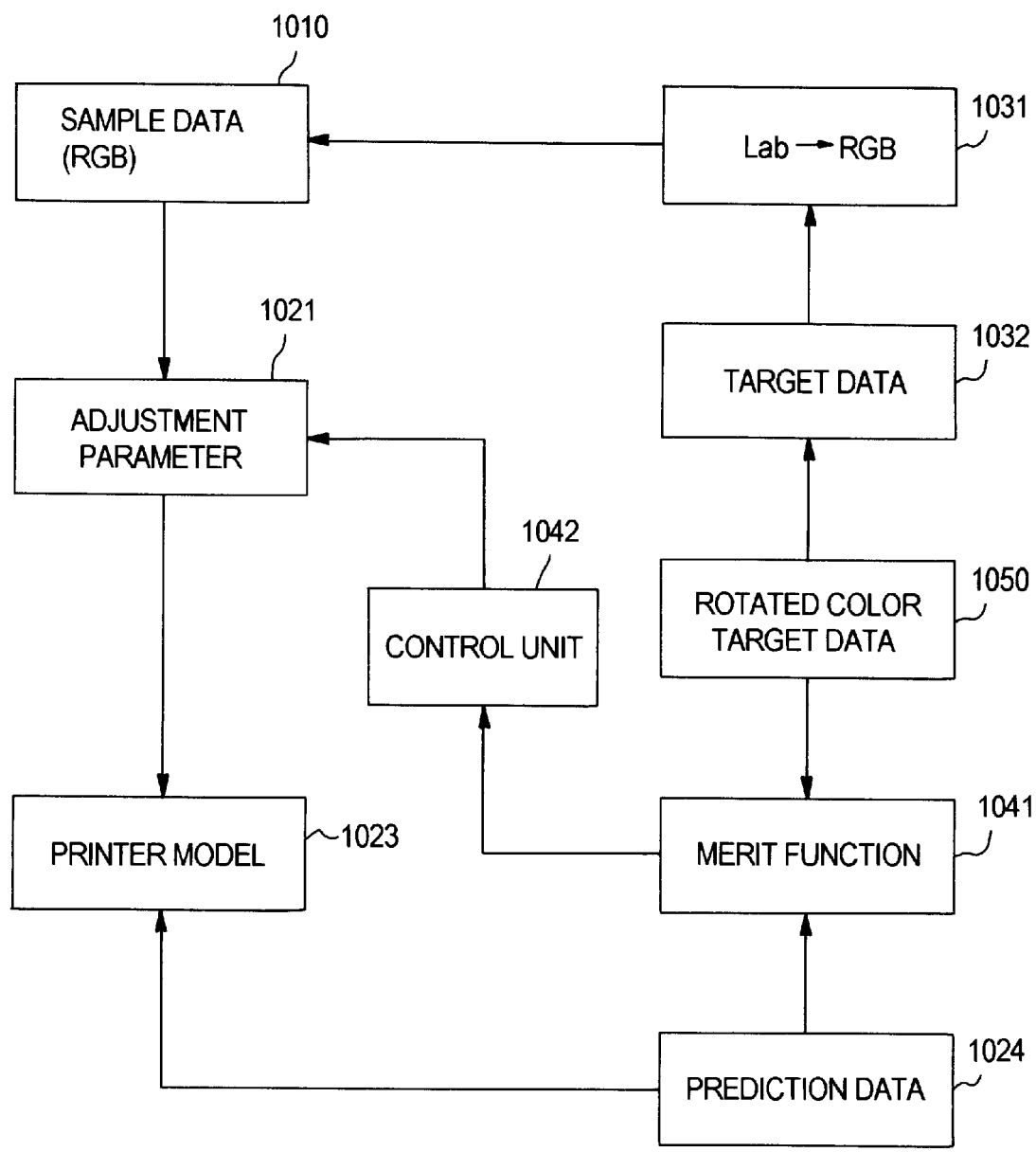
FIG. 4 is a block diagram showing an example of a simulation calculation for obtaining a parameter in a fine controlling process.

FIG. 4 is a block diagram showing the simulation for calculating the parameter to be used in case of forming the LUT concerning the fine control. In this case, the data obtained by uniformly dividing the cmyk colors is input in the color printer to which the rgb data is input so as to newly form a printer model 1023. In the printer model 1023, the sampling output is performed via output systems (i.e., processes subsequent to luminance density conversion process 814 in FIG. 2, a binarization process (not shown) and the like) including the CMYK color correction parameter which has been obtained in the process of FIG. 3, and then the sampling output is measured by the colorimeter, whereby the characteristic of the color printer is simulated. In the simulation, an output value (Lab value) corresponding to a value of the input rgb data is calculated and predicted. At this time, the color reproduction gamut of the printer is simultaneously checked, a color sample for uniformly dividing the color reproduction gamut as much as possible is appropriately picked up, and then the sample is newly generated as target data 1032 (Lab value).

In the simulation, the target data 1032 having the Lab value is converted into the RGB signal by using the conversion equation defined in NTSC (process 1031), to generate sample data (RGB) 1010. In this case, by using the sample data (RGB) as an input, in a correction process 1021 (same process as color correction conversion process 812 in FIG. 2), the color correction in the RGB color space is performed on the basis of the correction parameter. In such color correction, a parameter obtained by mapping as an initial value the RGB signal as is (in a unit of a matrix) is used as the correction parameter. Further, it is structured in the simulation calculation that the correction term is immediately increased or decreased immediately in response to instruction from a control unit 1042. In the correction process, the data which has been mapped from the RGB data into the rgb data is input to the printer model 1023, and the Lab value when outputting is predicted and data 1024 (Lab value) is calculated.

In this case, if the above-described printer model and the target data are determined, the parameter which is matched with the color (Lab value) on the monitor can be obtained in the conventional manner same as in the case of obtaining the correction parameter of the CMYK data.

However, in the present embodiment, in order to obtain the matching in the color appearance between the different kinds of devices, i.e., the monitor and the printer, it is generated new target data 1050 in which the hue of the target data is rotated in a clockwise direction in correspondence with the hue and saturation of the target data as shown in FIG. 6. A correction amount in this case has been set for each saturation of each hue of the RGB data (trichromatic data), as shown in FIG. 6. Therefore, for the target data other than the trichromatic data, the correction amount is interpolated such that a continuity between the adjacent hues is maintained, whereby the correction amount is set. As the correction amount, the correction amount is used which is suitable for each of the matching methods having the priority to vividness and the matching method having the priority to color tint. Then, the data added with the correction amount is entered into a merit function 1041. The entire error amount obtained by the merit function 1041 is then input to the control unit 1042, and the correction term is immediately increased or decreased in response to the instruction from the control unit 1042. In this case, the control unit 1042 refers to the result of the partial differential calculation or the like and observes the entire error amount. Simultaneously, the control unit 1042 increases or decreases each correction term such that the entire error amount is converged. The LUT is formed on the basis of the parameter obtained in the above-described simulation.

Further, in case of forming the LUT for the matching method of colorimetrically obtaining the matching, the same as in the case where the correction parameter for the CMYK data has been obtained, the parameter is determined such that the printer model and the target data are matched with each other.

(Second Embodiment)

In the color correction conversion process 812 according to the first embodiment, in the case where the matching method having the priority to vividness or the matching method having the priority to color tint is set, the matching process is performed on the basis of the set matching method. However, in the second embodiment, in case of setting the matching method, after the matching process described in the first embodiment, a following gamma process is further performed as the above-described fine control.

$$Xm=\max(R, G, B)$$

$$Xn=\min(R, G, B)$$

$$Xd=Xm-Xn$$

where Xm is a maximum value in the RGB colors, Xn is a minimum value in the RGB colors, and Xd is a difference between the maximum and minimum values.

$$\gamma=0.6+(Xd \cdot K1) \cdot (Xn \cdot K2)$$

Figure 7:
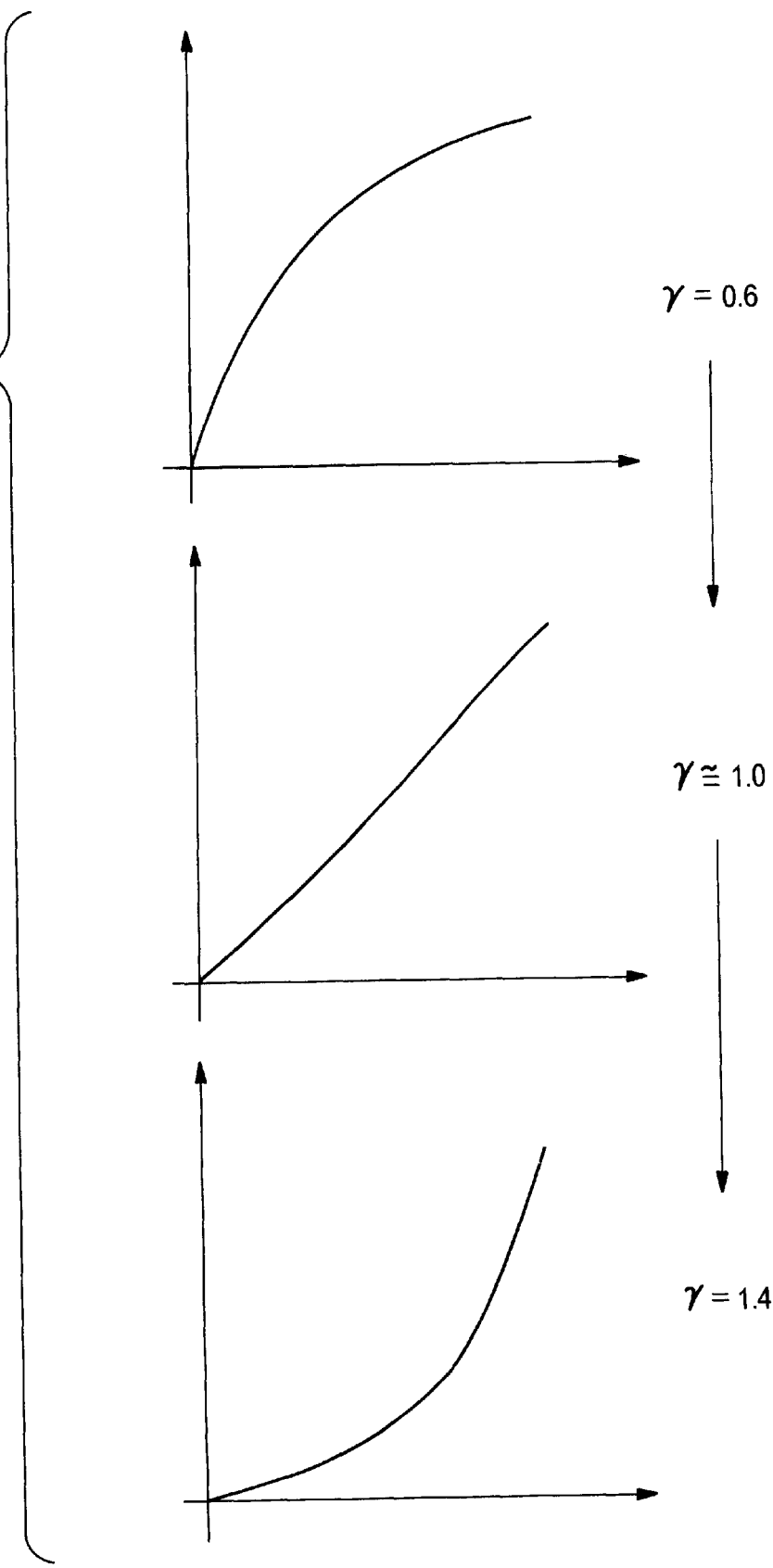
FIG. 7 is a view showing an example of a change in a gamma correction amount in a second embodiment of the present invention.

By using such equation, coefficients K1 and K2 are controlled, whereby degradation of saturation can be suppressed and also gradation in each primary color can be well reproduced. FIG. 7 shows that a gamma value varies from 0.6 to the extent of 1.4. If the gamma value is set to have a value close to 0.6 in the vicinity of a primary color axis and a monochromatic axis and to have a value close to the extent of 1.4 in the vicinity of an intermediate color, more excellent color reproduction can be realized for any image.

Figure 8:
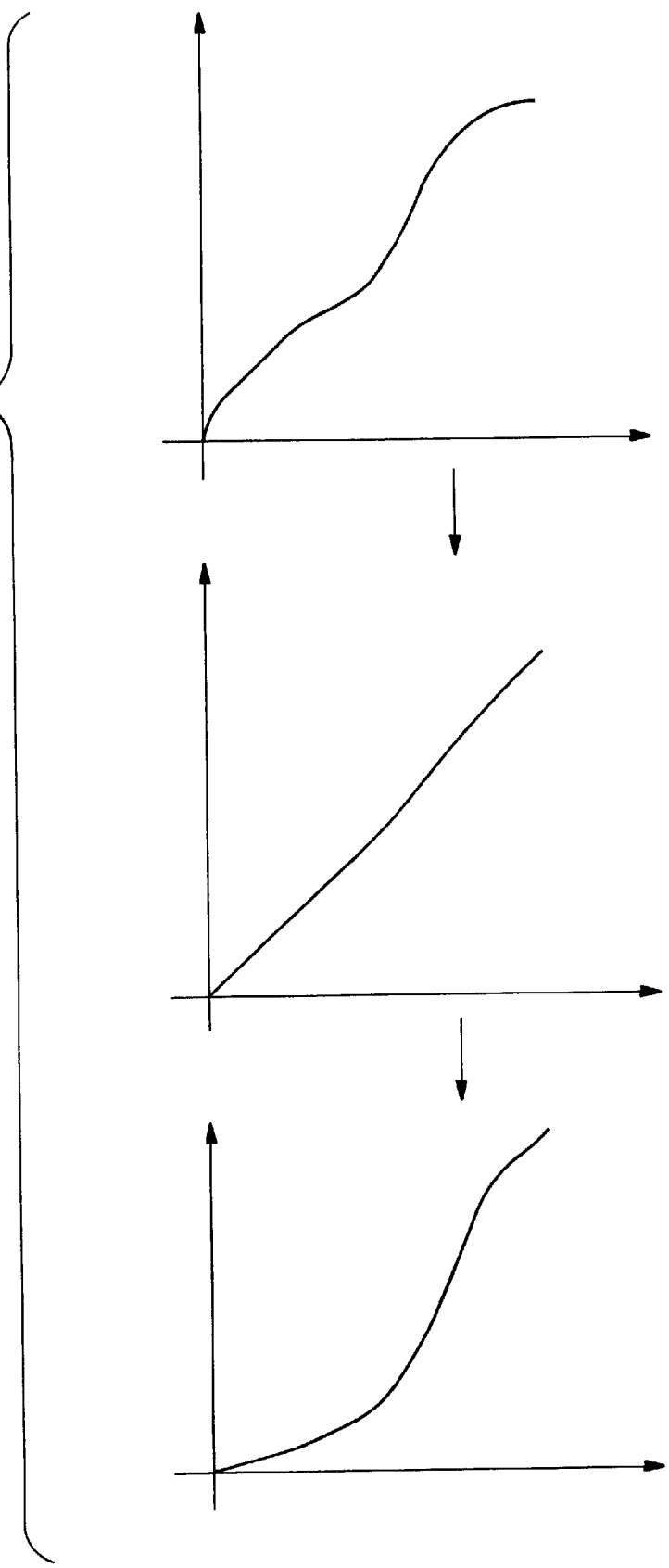
FIG. 8 is a view showing a modified example of the change in the gamma correction amount in the second embodiment.

The non-linear gamma process used in the present invention is not limited to the simple process as shown in FIG. 7. For example, as shown in FIG. 8, the gamma process may be defined such that the gamma value varies complicatedly and functionally.

(Third Embodiment)

The first and second embodiments respectively show the method for matching the color on the monitor and the color on the printer with each other by processing the color on the monitor.

However, in case of obtaining faithful color reproduction, there is a limitation when a color which is remarkably irradiated on a color monitor is reproduced on a color printer. For example, since green is yet within a fluorescent color region on the monitor, such green can not be reproduced on the color printer even by using a green ink filled in the printer. Therefore, in order to reproduce such green, a color printer must be specially provided which has a fluorescent paint. However, this is not practical due to a problem in cost or the like.

In the third embodiment, a structure is provided in which a system printer is first selected by a printer selector, a printer profile is then selected on the basis of the selected system printer, then after color palette data is generated on the basis of the selected printer profile, and the obtained color palette data is provided in a client program. That is, by such structure, it is a function is provided for previously suppressing as much as possible a color which can not be reproduced by the printer. In the third embodiment, the printer profile may be arbitrarily and manually selected by a user.

Figure 9:
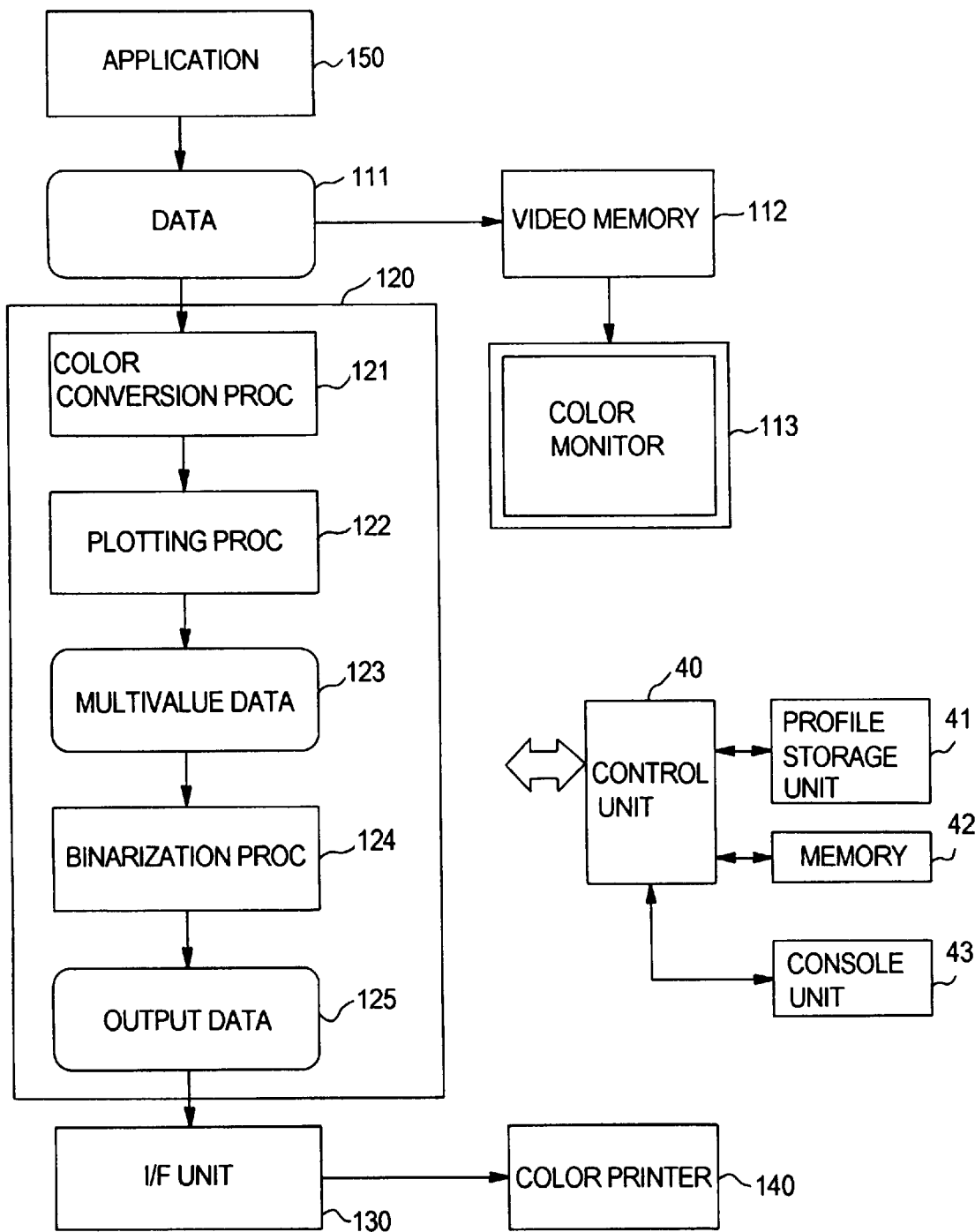
FIG. 9 is a block diagram showing a color printing system according to a third embodiment of the present invention.

FIG. 9 is a schematic block diagram showing a color image process system according to the third embodiment. In FIG. 9, the structural components the same as those in FIG. 1 are added with the same reference numerals, and thus the detailed explanation thereof are omitted.

In the color image process system shown in FIG. 9, a control unit 40 controls a process on the basis of a program stored in a memory 42.

Figure 10:
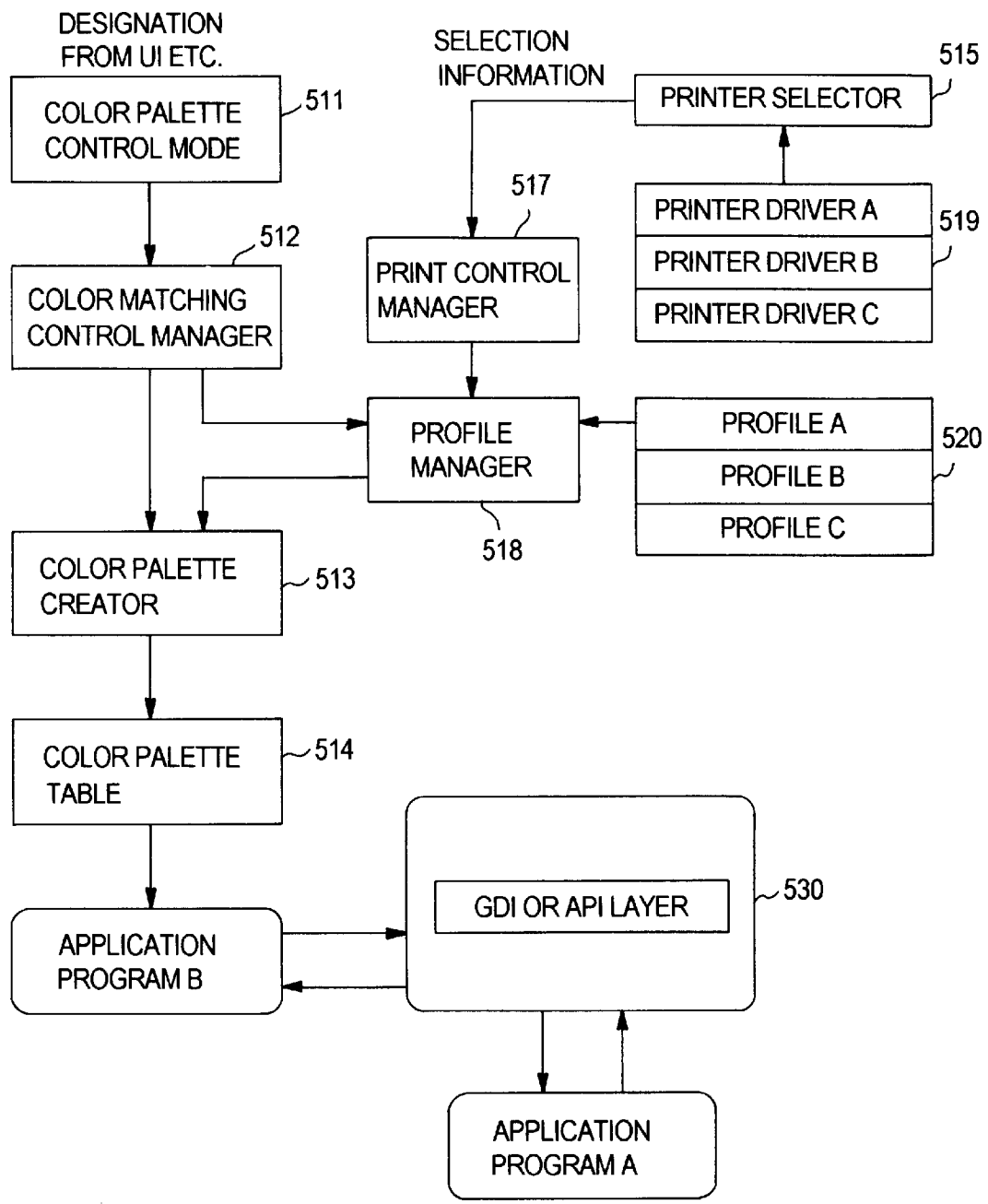
FIG. 10 is a block diagram showing an example of flow in a process according to the third embodiment.

An application (i.e., application program) 150 is used to generate a color image by using a color palette table as shown in FIG. 10. Image data which consists of the color palette data representing the color images generated based on the application 150 is stored once in the memory 42 together with the color palette table. Then, when printing and displaying are instructed by the user, the color palette data is converted into full-color data represented by RGB color data each having eight bits, on the basis of the color palette table. Thereafter, the obtained full-color data is transferred to a module group 120 and a video memory 112.

FIG. 12 shows the configuration of the color palette table. That is, in the color palette table, N pairs of palette number and full-color data represented by the RGB color data each having eight bits are stored in correspondence with the color palette data. In the case of N=255, total 256 colors can be registered in the color palette table, and the color palette number can be represented by the eight-bit data. Therefore, the color image which has been generated based on the application 150 can be represented by the color palette data having eight bits for each pixel.

For this reason, as compared with a case where the color image is represented by the full-color data (i.e., RGB color data each having eight bits), memory capacity can be reduced to ⅓.

Figure 11:
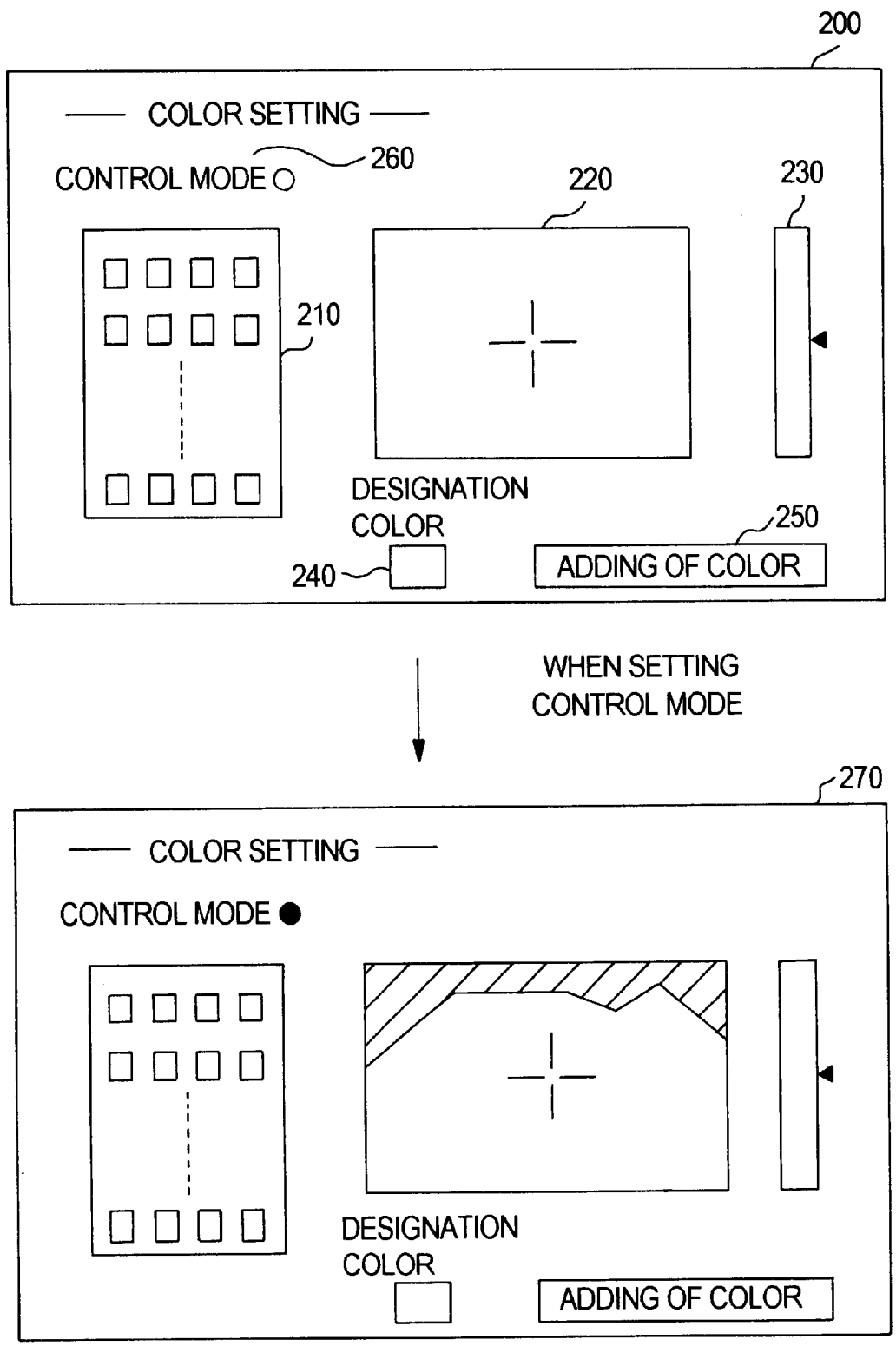
FIG. 11 is a view showing an example of a UI (user interface) according to the third embodiment.

In the case where the color image is generated based on the application 150, it is displayed on a console unit 43 an UI (user interface) shown in FIG. 11 for setting the colors of the color palette table.

An UI 200 is used to register the colors capable of being used in the application in the color palette table, up to N+1 colors. Reference numeral 210 denotes a portion for displaying the registered colors. Reference numeral 230 denotes a portion for designating brightness. In the portion 230, as an arrow is moved upward, a designation color 240 becomes brighter. Reference numeral 220 denotes a portion for designating a hue and a saturation. In the portion 220, as a cursor is moved upward, the saturation becomes higher. Further, by moving the cursor rightward and leftward, the desired hue can be designated. In a case where the desired designation color 240 could be designated, the color can be registered in the color palette table by depressing a color addition button 250, and thus the designation colors are displayed on the portion 210.

In a case where a color palette control mode 260 which constructs the feature of the present embodiment is set in the UI 200, an UI 270 is displayed. In the UI 270, an outside portion of a color reproduction gamut is displayed as a void (or blank area) on the portion 220 such that a color belonging to the outside of the color reproduction gamut can not be registered in the color palette table.

If the color palette control mode is set, a color matching control manager 512 performs a gamut check for the color displayed on the portion 220, on the basis of printer color reproduction gamut information stored in the selected printer profile. As a result of such the gamut check, the color judged as the color outside the color reproduction gamut is replaced by white (R=G=B=255), whereby the outside portion of the color reproduction gamut can be displayed as the void on the portion 220.

Ordinarily, the color palette control mode is not being designated. However, in a case where the colors to be registered in the color palette table are previously restricted due to user's desire, the color palette control mode is designated.

As described above, if the user sets the color palette control mode, all the image data generated based on the application 150 are within the color reproduction gamut of the color printer 140. Therefore, there is no need to absorb a difference in the color reproduction gamut inherent to each device in a matching process performed in a color conversion process 121. For this reason, in the case where the color palette control mode has been set, as the matching method, the control unit 40 automatically sets the matching method for obtaining colorimetrical matching in a color correction conversion 812. On the other hand, in the case where the color palette control mode is not being set, the user is requested to set the matching method when the printing.

By interlocking the color palette control mode and the matching method, the color of the color image generated based on the application 150 can be matched with the color of the image formed by the color printer 140 in the color image process system, as a whole.

FIG. 10 shows a flow of the process according to the third embodiment. In a case where a color palette control mode 511 has been designated on the UI, such information is sent to the color matching control manager 512. Ordinarily, such mode is not designated. However, in the case where the colors capable of being used on the monitor are previously restricted due to user's desire, the color palette control mode 511 is designated.

A printer selector 515 selects only one printer to be used in the system, from among a plurality of drivers in a printer driver group 519. Simultaneously, the printer selector 515 supplies selection information to a print control manager 517. A profile manager 518 can derive the corresponding profile in a profile information group 520, by referring to the selection information in the printer control manager 517.

In such profile, information representing the color reproduction gamut of each printer has been stored or described.

Only in the case where the color palette control mode has been designated, the color matching control manager 512 performs inquiry to the profile manager 518 and then notifies a color palette creator 513 of the information concerning a color palette to be used. Thus, a practical color palette table 514 which is composed of the colors within the color reproduction gamut of the printer is formed or updated.

In this case, an application program A conventionally used does not have any means for communicating with the color palette table 514, whereby the application program A can use only a function which is supported by an API provided in the system. On the other hand, in a newly-designed application program B, the colors which can not be reproduced by the color printer can be previously restricted by using the color palette table 514.

In the case where the color palette control mode is not being designated, the color palette creator 513 does not operate. Therefore, as in the past, the color image is generated by using the color palette table which has been set and stored. The updating and forming of the color palette table to be used in such case is supported or controlled by a unit 530. Therefore, both the application programs B and A can use the palette table.

(Fourth Embodiment)

In the foregoing third embodiment, a structure has been provided in which the system printer is first selected by the printer selector, the printer profile is then selected on the basis of the selected system printer, after then the color palette data is generated on the basis of the selected printer profile, and the obtained color palette data is provided in the client program. That is, by such structure, the fourth embodiment provides the function for previously suppressing as much as possible the color which can not be reproduced by the printer. On the other hand, the fourth embodiment shows the same system as to an OS (operating system) having the structure in which a color palette is managed or controlled on a system side.

Figure 13:
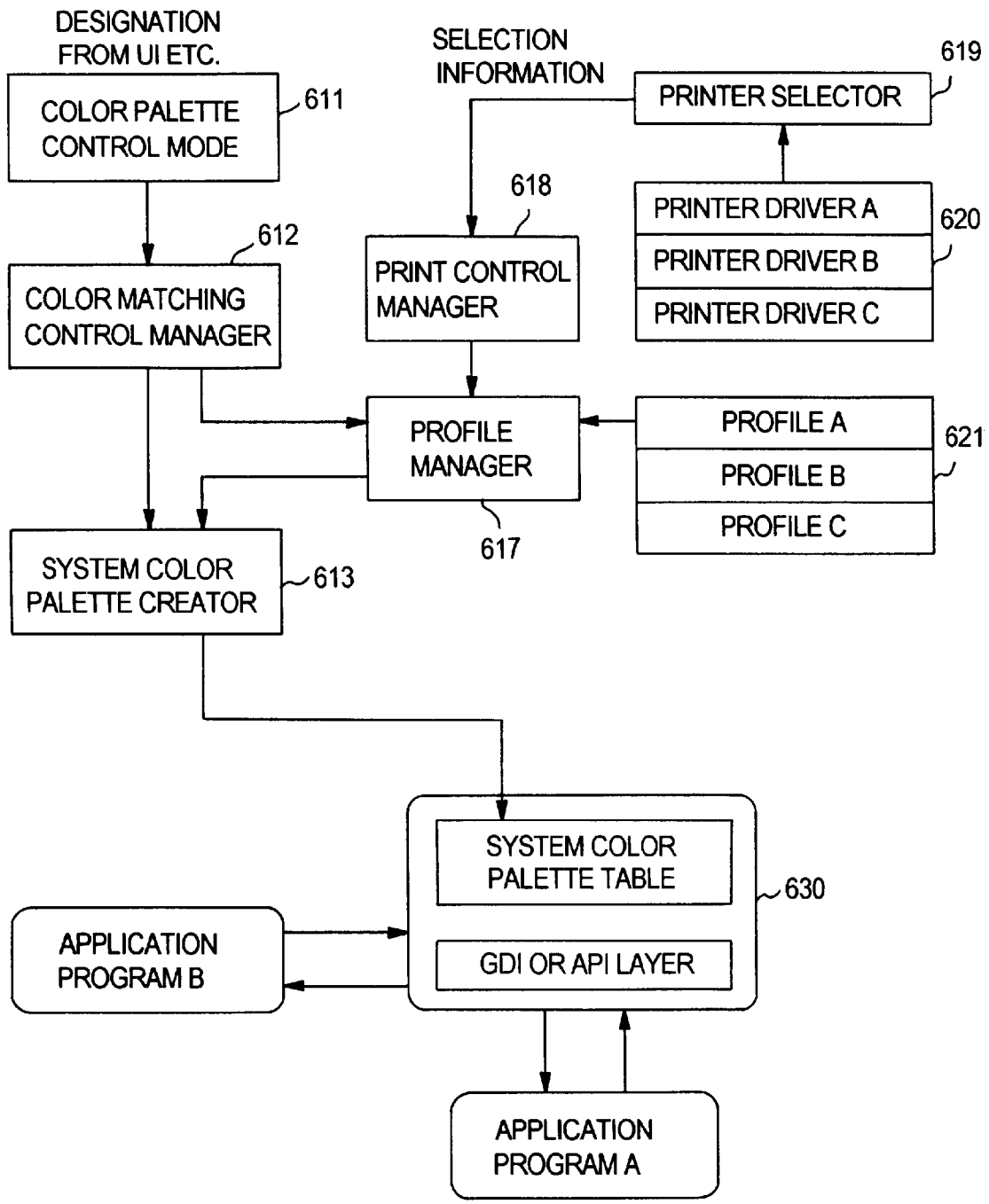
FIG. 13 is a block diagram showing an example of flow in a process according to a fourth embodiment of the present invention.

As shown in FIG. 13, in a case where a color palette control mode 611 has been designated on an UI which is set on the system side, such information is sent to a color matching control manager 612. Ordinarily, such mode is not designated. However, in the case where the colors capable of being managed on a monitor are previously restricted due to user's desire, the color palette control mode 611 is designated.

A printer selector 619 selects only one printer to be used in the system, from among a plurality of printer drivers in a printer driver group 620. Simultaneously, the printer selector 619 supplies selection information to a print control manager 618. A profile manager 617 can derive a corresponding profile in a profile information group 621, by referring to the selection information in the printer control manager 618. Only in the case where the color palette control mode 611 has been designated, the color matching control manager 612 performs inquiry to the profile manager 617 and then notifies a color palette creator 613 of information concerning the color palette to be used, whereby a system color palette table 630 is formed or updated.

In the fourth embodiment, the colors which can not be reproduced by the color printer can be previously restricted in application programs B and A (both client programs) which utilize the system color palette.

Although the present invention has been described above with respect to the preferred embodiments, the invention is not limited to the construction or structure of the above embodiments as many modifications and variations are possible within the spirit and scope of the appended claims of the invention.

What is claimed is:

1. An image processing method comprising the steps of:
   generating a palette table in which colors instructed by a user are registered;
   generating a color image by using the generated palette table; and
   executing a color matching for the generated color image, corresponding to a gamut of an image output means,
   wherein a mode relating to generating the palette table includes a first mode of restricting colors registerable in the palette table according to the gamut of said image output means and a second mode of not restricting colors registerable in the palette table are provided to prepare the palette table, and
   wherein in the first mode, the color matching is set to colorimetrical color matching, and in the second mode, the color matching is set by the user selecting one of a plurality of kinds of color matching including colorimetrical color matching.

2. A method according to claim 1, further comprising the steps of:
   setting a kind of the image output means; and
   reading profile data corresponding to the kind of the image output means which has been set in said setting step,
   wherein the profile data includes the gamut data.

3. A method according to claim 2, wherein, in said setting step, the kind of the image output means is set on the basis of system printer information.

4. A method according to claim 2, wherein, in said setting step, the kind of the image output means is set on the basis of manual instruction by a user.

5. An image processing apparatus comprising:
   generating means for preparing a palette table in which colors instructed by a user are registered;
   color image generation means for generating a color image by using the generated palette table; and
   executing means for executing a color matching for the generated color image, corresponding to a gamut of an image output means,
   wherein a mode relating to generating the palette table includes a first mode of restricting colors registerable in the palette table according to the gamut of said image output means and a second mode of not restricting colors registerable in the palette table are provided to prepare the palette table, and
   wherein in the first mode, the color matching is set to colorimetrical color matching, and in the second mode, the color matching is set by the user selecting one of a plurality of kinds of color matching including colorimetrical color matching.

6. An apparatus according to claim 5, further comprising image forming means for forming an output color image on a recording medium on the basis of the color image for which the color matching was executed.

7. A recording medium for recording thereon a program concerning an image processing method comprising the steps of:
   generating a palette table in which colors instructed by a user are registered;
   generating a color image by using the generated palette table; and
   executing a color matching for the generated color image, corresponding to a gamut of an image output means,
   wherein a mode relating to generating the palette table includes a first mode of restricting colors registerable in the palette table according to the gamut of said image output means and a second mode of not restricting colors registerable in the palette table are provided to prepare the palette table, and
   wherein in the first mode, the color matching is set to colorimetrical color matching, and in the second mode, the color matching is set by the user selecting one of a plurality of kinds of color matching including colorimetrical color matching controlled according to the mode in which the palette table for generating the color image is generated.

* * * * *